United States Patent [19]

Bell et al.

[11] Patent Number: 5,333,829
[45] Date of Patent: Aug. 2, 1994

[54] HOLDER FOR PISTOLS, RIFLES, CAMERAS AND THE LIKE

[75] Inventors: Dennis L. Bell, Greeley, Colo.; Ray C. Millett, Huntington Beach, Calif.

[73] Assignee: Millett Industries, Huntington Beach, Calif.

[21] Appl. No.: 925,998

[22] Filed: Aug. 6, 1992

[51] Int. Cl.⁵ ............................................. F41A 23/02
[52] U.S. Cl. ..................................... 248/634; 42/94; 211/64
[58] Field of Search ................. 42/94; 248/634, 603, 248/614, 615, 622, 632, 633; 211/64, 60.1, 87

[56] References Cited

U.S. PATENT DOCUMENTS

| | | | |
|---|---|---|---|
| 2,569,435 | 9/1951 | Martin | 42/94 |
| 3,473,673 | 10/1969 | Porter | 211/64 |
| 3,935,657 | 2/1975 | Wade | 42/94 |
| 3,947,988 | 4/1976 | Besaw | 42/94 |
| 4,558,532 | 12/1985 | Wright | 42/94 |
| 4,790,096 | 12/1988 | Gibson et al. | 42/94 |
| 4,821,443 | 4/1989 | Bianco | 42/94 |
| 4,873,777 | 10/1989 | Southard | 42/94 |
| 4,924,616 | 5/1990 | Bell | 42/94 |
| 5,050,330 | 9/1991 | Pilgrim et al. | 42/94 |

OTHER PUBLICATIONS

Kelver, Gerald O., "Reloading Tools, Sights and Telescopes for Single Shot Rifles," Chapter 13, pp. 149-153 (1982).
Leatherdale, Frank & Paul, "Successful Pistol Shooting," pp. 96-99 (1988).
Lewis, Jack (ed.), "Handguns '92", pp. 68, 85, 87, 92, 150, 153 & 166-168 (1991).
Ellet Brothers Catalog, p. 404.
W Hunting & Sporting Products, (1989) (1 page).
AcuSport, Outdoor Sporting Products, catalog 27A, (2 pages).
Brownells Catalog (1 page), catalog number 44, (1991–1992).
Buckeye Sports Supply Catalog, pp. 335-336.
Burtin Corporation, Product Information, (1 page)' (1990).
Millet Sights TM, Box Packaging Photographs, Millet Industries (1991)–(3 pages).

*Primary Examiner*—Rinaldi I. Rada
*Attorney, Agent, or Firm*—Norvell E. Von Behren; Michael A. Capraro

[57] ABSTRACT

A new and novel holder or support device unit for use in shops, stores and in the field, the holder being the type that may be used to display and/or rest various items such as rifles, pistols, still cameras, video cameras and the like. The new and novel holder is semi-rigidly formed in a single component from a foam which provides a microcellular inner core and a tough integral leather-like exterior surface providing enough inertia absorption, impact resistance and resiliency that the device can be easily and safely used to support a firearm, while discharging the firearm, as well as effectively and safely supporting other items. Items may be placed and held on the holder in a desired position and for a specific purpose such as customer display, cleaning, maintenance, disassembly, and/or field steadying of the item. Also disclosed is a novel method of producing the unique holders described herein.

8 Claims, 5 Drawing Sheets

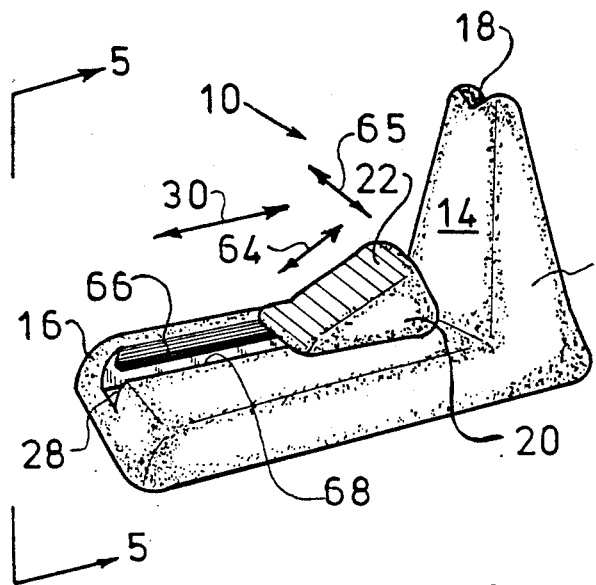
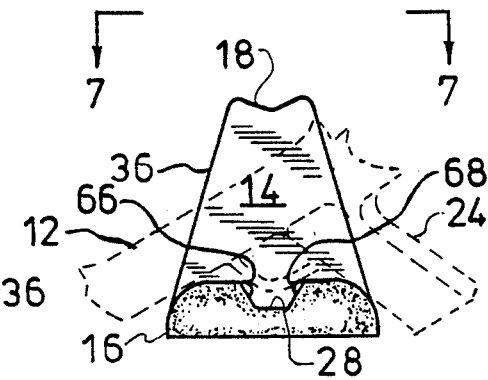
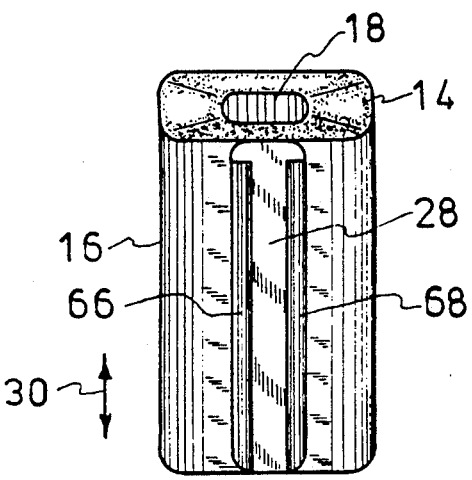
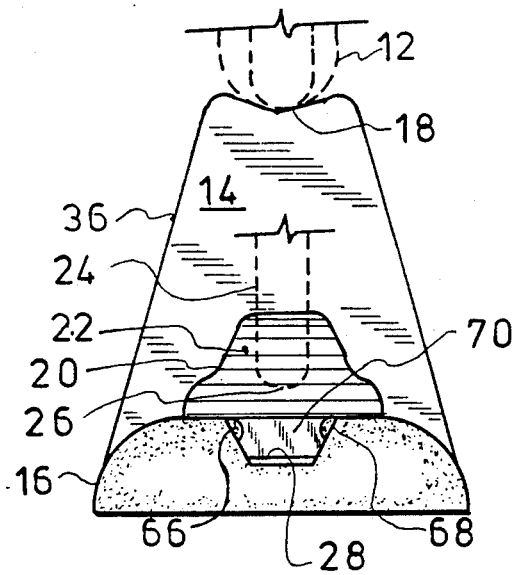
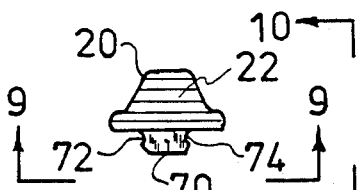
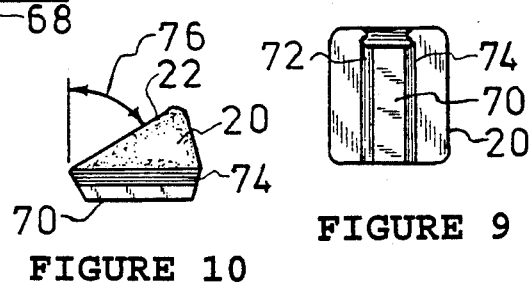

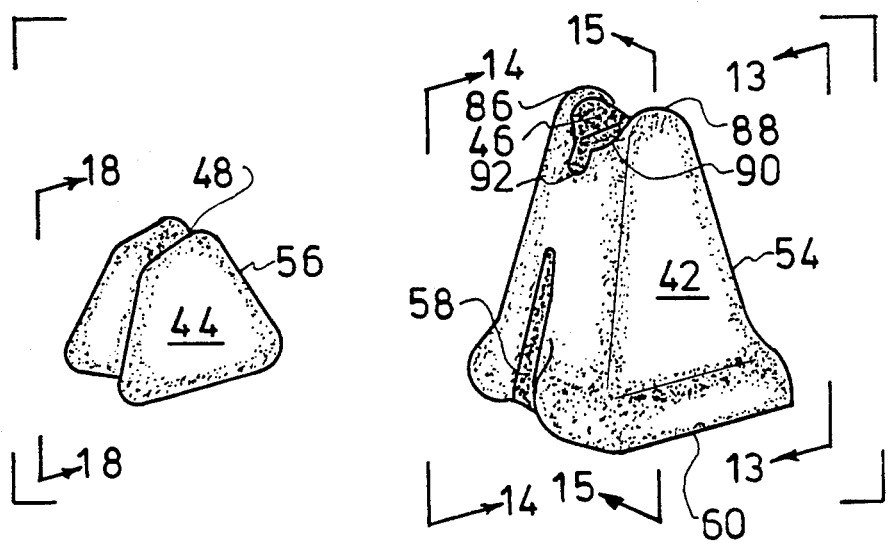
FIGURE 11
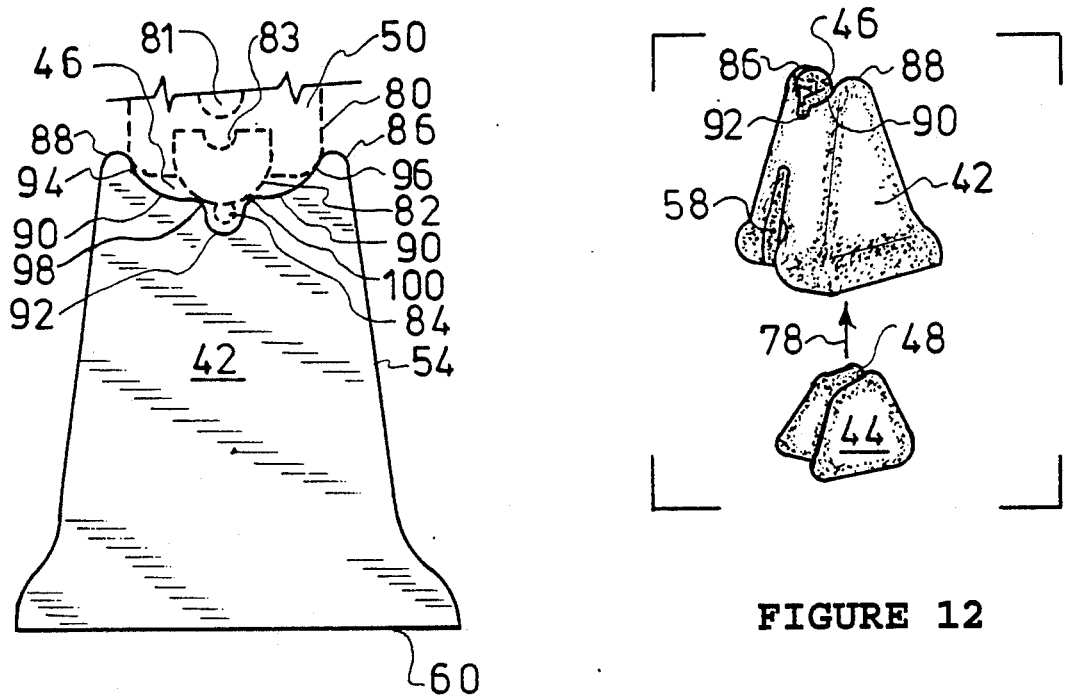
FIGURE 12
FIGURE 13
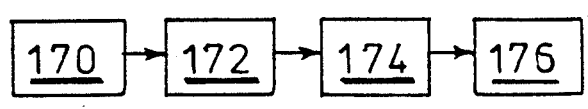
FIGURE 27
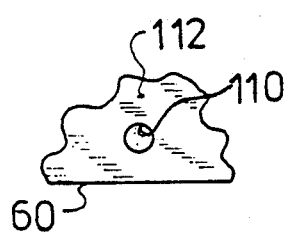
FIGURE 17

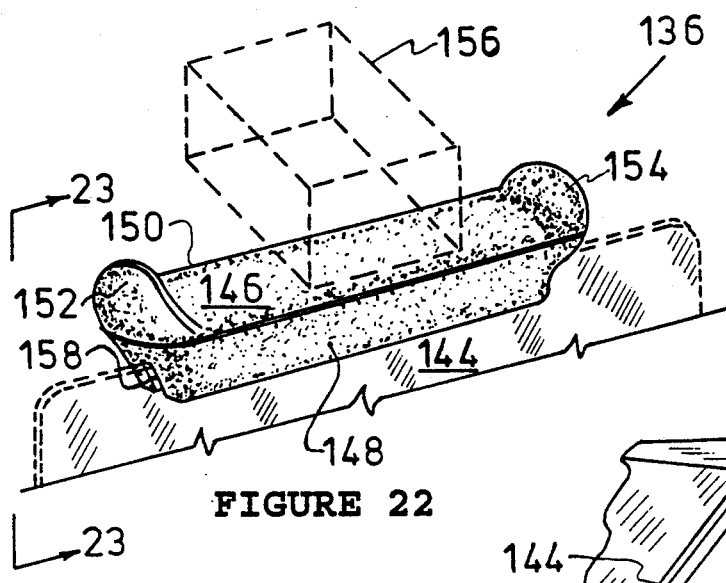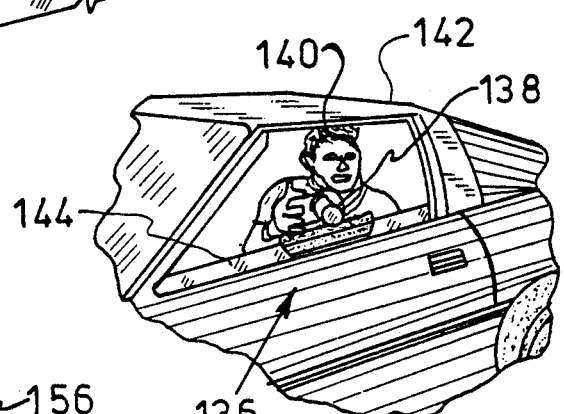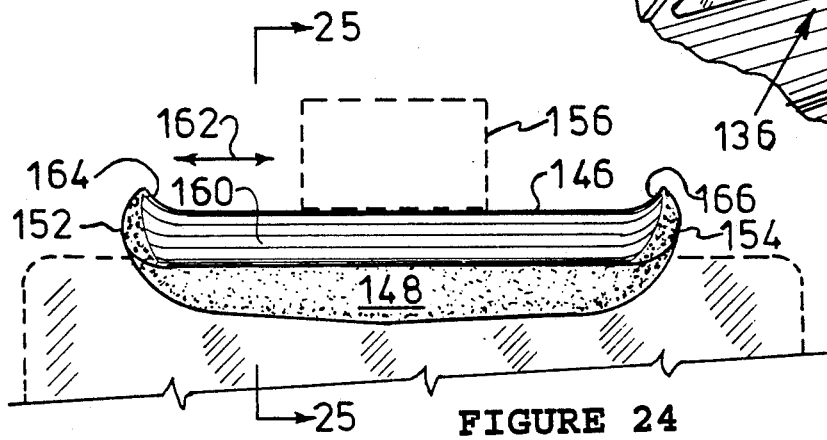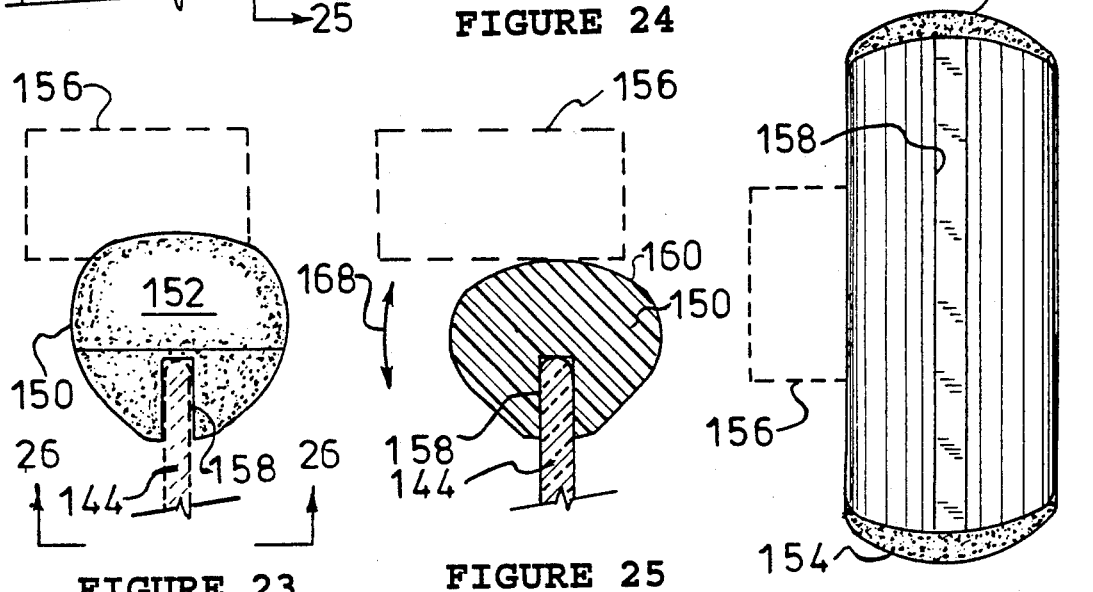

HOLDER FOR PISTOLS, RIFLES, CAMERAS AND THE LIKE

BACKGROUND OF THE INVENTION

This invention relates generally to holders that may be used to display and/or rest various items such as rifles, pistols, still cameras, video cameras and the like and more specifically to a new and improved holder or support device unit which allows the items to be placed and held on the holder in a desired position for a specific purpose such as customer display, cleaning, maintenance, disassembly and/or field steadying of the item. The new and novel holder or support device unit is designed to be used with a variety of items requiring steady support and particularly designed to allow the steady support of firearms while providing inertia absorption, impact resistance and resiliency when a supported firearm is discharged from the holder.

Steady support of items that are used to "sight" to a distant object is critical in many situations. In particular, a sportsman using a rifle, shotgun or pistol for target practicing or competition relies heavily on the support device to maintain accuracy when discharging the firearm.

Many holders or support devices used by sportsmen are assembled from radically different types of materials. The most popular devices are "bags" having a tough outer skin, such as leather or nylon, filled with sand or foam. These devices require the user to constantly "fluff" or rearrange the bag to provide a stable shooting surface. Once the bag is properly adjusted, the inertia from the discharge of the firearm spoils the "fluff" and the shooter must readjust the device before firing again.

Other problems are encountered with the bag type system as well. Repeated discharging of a firearm eventually destroys the integrity of the outer skin. This destruction is caused by two factors. First, the bag cannot adequately absorb the inertia or recoil produced by the firearm on discharge. Second, many firearms, especially rifles, have a sling stud on the underside of the stock which tends to rip the outer skin of the bag.

Additionally, many sportsman have found the necessity to stack various sizes of bags, in many different configurations, to achieve the desired height for shooting. Once the bags are stacked, the inertia from the discharge of the firearm often ruins the sportsman's handy work and the bags must be re-stacked and readjusted for the next shot. The bag system of supporting a firearm is also cumbersome and time consuming, especially when more than one bag must be used for proper height adjustment.

For additional information on these types of support devices see generally: Ellet Brothers Catalog, Hunting & Sporting Products Catalog, AcuSport Outdoor Sporting Products Catalog #27A, Browneils Catalog #44 (1991-1992) and Buckeye Sports Supply Catalog.

Another type of device developed for steadying a firearm when used for target practice or competition is the tripod or bench style rest. These devices are generally constructed of metal with metal or similarly rigid support legs which are secured to a board or bench by bolting the legs, or a base to which the legs are attached, to the board or bench. A few have been designed to be free standing.

These devices have encountered similar problems as found in the bag system. The portion of the device on which the firearm rests is generally a shaped piece of metal covered with a protective rubber like coating, felt, lambskin or similar material. The protective coating that is applied to the firearm resting point wears down with repeated firing until the metal substructure is exposed thereby damaging the firearm.

These types of support devices are unable to absorb the inertia or recoil of a discharged firearm resting on them because of their rigid structure. Besides increased wear on the device and damage to the firearm, most of the recoil must then be absorbed by the shooter.

In the free-standing models the legs are firmly planted in the ground when in use, thus the shooter still absorbs a majority of the recoil as the device is unable to. If the legs are not firmly planted in the ground before use, there is a tendency for the device to slide when the firearm is discharged necessitating readjustment of the device for the next shot.

Additionally, in those devices that support only the forearm or front portion of a rifle or shot gun, much of the stability of the firearm is dependent on the individual shooter. In those devices where both the front and rear portion of the firearm is supported, the design of the device makes it particularly uncomfortable to use.

The tripod or bench style rests are very cumbersome when transporting to and from the shooting site. Once at the shooting site these devices must be secured to a board or bench and the proper height for shooting must then be determined. This is generally accomplished by trial and error where the height of the front portion of the firearm is continually changed by adjusting the height of the front firearm-to-support device contact point. Height adjustment of these devices is usually accomplished by a wheel mechanism or shaft and locking mechanism. Constant readjustment of this type is time consuming and frustrating.

For additional information on these types of support devices see generally: Ellet Brothers Catalog, Hunting & Sporting Products Catalog, AcuSport Outdoor Sporting Catalog #27A, Browneils Catalog #44 (1991-1992) and Buckeye Sports Supply Catalog.

In nearly all of the holders or support devices heretofore described, the actual contact area where the firearm is supported by the device is flat and rather wide. The barrel and stock forearm of a firearm is curved and so the flat wide support area allows the firearm to roll sideways. Even in those devices where the support area is curved, the curve is generally much larger than the barrel or forearm of the firearm continuing to allow sideways rolling.

In an effort to overcome some of the problems detailed above, some prior art devices are designed to be "easily adjustable". There are two methods generally employed to accomplish this. One method requires the device to be designed in a triangular shape with the sides being "stepped" to achieve varying heights. Adjustment of this device requires the user to literally pick up the device and turn it to the appropriate side and then to try each "step" on that side until the proper height is determined.

This type of support device is often constructed of a solid material with a smooth hard surface. The rigidity of the device and the smoothness of the surface transfers the inertia or recoil of a discharged firearm to the shooter. Additionally, the smooth surface causes the firearm to roll in a sideways motion as previously discussed.

The second method utilized is to provide a generally trapzoidal support device with an essentially adjustable base. By adjusting the width of the base, the height of the device can be changed. These devices are generally constructed of an inner foam core covered with a nylon outer skin.

Since these devices are constructed of dissimilar materials, delamination of the covering from the core occurs after repeated use. Also, because the inner core must be soft enough to expand or collapse when adjusting the device, inertia absorption, impact ability and resiliency are reduced.

For additional information on these types of support devices see generally: Hunting & Sporting Products Catalog, AcuSport Outdoor Sporting Products Catalog #27A and Buckeye Sports Supply Catalog. For additional background information, reference should be made to the prior art materials filed with this application.

When not using firearms in the field, the sportsman may wish to easily display them. Shop keepers and distributor find it beneficial to be able to display firearm in a manner that not only exposes as much of the firearm as possible but shows the use of the firearm in a favorable field situation as well. The prior art devices are not conducive to these objectives.

Prior art device are too bulky and cumbersome to make effective displays. In addition to taking up a lot of space prior art devices require constant "fluffing" or readjustment when the firearm is removed for inspection and then replaced on the display. Furthermore, the prior art devices are not attractive or aesthetically pleasing.

When the before mentioned prior art devices are used with items such as cameras, video cameras, telescopes and the like, many of the foregoing problems persist. For example, the fluffing and stacking problem inherent with the bag system, the eventual delamination, ripping and wearing of the item-to-device contact point and lack of inertia absorption, impact resistance and resiliency.

Although items such as cameras, telescopes and the like produce no inertia of their own, these items are often used in a moving vehicle and the movement of the vehicle combined with the weight of the item creates inertia which can effect not only the item but also the support device. The prior art devices therefore suffer similar wear and destruction when used under these circumstances and the camera, telescope or the like can be easily damaged by the support device itself.

SUMMARY OF THE INVENTION

To overcome the before described considerations and problems inherent in and encountered with prior art support devices, there is provided by the subject invention a unique holder device. The new and novel holder device provides enough inertia absorption, impact resistance and resiliency that the device can be easily and safely used to support a firearm to be discharged as well as effectively and safely supporting other items.

To alleviate the fluffing and stacking problem encountered with prior art devices, applicant's new and novel holder for pistols, rifles, cameras and the like is semi-rigidly formed from a two element alloy balanced component. This component provides a microcellular inner core while the exterior surface forms a tough leather-like inertia absorbing texture. The multi-element alloyed balanced component is rigid enough to provide impact resistance yet flexible enough to also provide inertia absorption and resiliency.

The multi-element alloy balanced component construction forms a single integral holder which is not vulnerable to delamination, ripping and tearing like prior art devices because there are no seams, stitches or soft cloth-like material that is easily displaced or destroyed when subjected to inertia or stress. The single component holder completely eliminates any separate outer skin. Additionally, applicant's new and novel holder is designed so that sling studs or other protrusion on the forearm stock of a firearm pass through a U-shaped groove in the firearm-to-support device contact area. This design helps prevent the sling stud or other protrusion from damaging the device.

Applicant's new and novel holder in an embodiment is further designed to have a front support area and a rear support area. Unlike prior art devices designed with a front and rear support, applicant's new and novel device is easy to use and comfortable. More importantly, applicant's double support system in one embodiment provides an easy and reliable means of quickly and accurately adjusting the firearm to a proper height for shooting. Other items used with applicant's device can be adjusted with similar ease.

The lightweight and compact design of applicant's new and novel support device unit makes it easy to transport to and from the field site. Furthermore, the unique design of the novel holder eliminates the need for bolting the device to a board or bench before use. Since the applicant's new and novel holder readily absorbs inertia created by the item in use, a firearm for example, movement of the device upon discharge of the firearm is minimal.

The unique design in the item-to-support device contact area, or pillow area, of applicant's new and novel holder prevents the sideways rolling of the supported item as commonly observed in the prior art devices. Additionally, the unique design of the pillow or cradle area allows support of items with various configurations. For example, the applicant's new and novel holder readily supports firearms with varying barrel diameters or with varying stock designs and provides two contact support points instead of one support point as is common in prior art devices.

Applicant's new and novel holder also provides a compact aesthetically pleasing support device unit for use in displaying firearms or other items. The firearm or item being displayed is fully exposed so all details can be clearly seen without disturbing the display. Even if the firearm or other item is removed from the display, readjustment of the display is not required when replacing the firearm or other device. Furthermore, the leather-like texture of applicant's new and novel holder provides a solidly rugged appearance enhancing the item being displayed. The display use of the applicant's novel holder can be seen in the prior art photographs of various box panels of the holder as sold by applicant under the trademark Benchmaster and as filed herein as prior art.

Accordingly, it is an object and advantage of the invention to provide a new and novel holder that permits safe and effective support of various items especially of firearms.

Another object and advantage of the invention is to provide a new and novel holder that provides effective inertia absorption, impact resistance and resiliency.

Yet another object and advantage of the invention is to provide a new and novel holder that is easily transportable, does not require further assembly at the field site and is easily adjustable.

Still another object and advantage of the invention is to provide a new and novel holder that prevents the sideways roll inherent in rounded items that are being supported.

An additional object and advantage of the invention is to provide a new and novel holder that provides a convenient and aesthetically pleasing display support when the item being displayed not being used in the field.

These and other objects and advantages will become apparent from review of the drawings and from a study of the Description of the Preferred Embodiment relating to the drawings which has been provided by way of illustration only.

BRIEF DESCRIPTION OF THE DRAWINGS

FIG. 4 is a perspective view similar to the FIG. 1 view of applicant's new and novel holder, showing the handgun removed from the holder.

FIG. 5 is an elevational view taken along lines 5—5 of FIG. 4.

FIG. 6 is a reduced elevational view similar to the view of FIG. 5 and taken along lines 5—5 of FIG. 4 with the inclined support member removed from the holder for purposes of clarity. FIG. 6 also shows a handgun in dashed lines to illustrate how the handgun may be positioned on the device during a non-firing condition.

FIG. 7 is a top plan view taken along lines 7—7 of FIG. 6.

FIG. 8 is a rear end view of the inclined support member.

FIG. 9 is a bottom plan view of the inclined support member taken along lines 9—9 of FIG. 8.

FIG. 10 is right side elevational view taken along lines 10—10 of FIG. 8.

FIG. 11 is a perspective view of applicant's new and novel holder, the holder embodiment shown being particularly suited for rifles and shotguns. The firearm is not shown for purposes of clarity.

FIG. 12 is a perspective view of applicant's new and novel holder, the holder being in a position to store the smaller upstanding support member into the hollow core of the larger upstanding support member.

FIG. 13 is an elevational rear end view of the larger upstanding support member taken along lines 13—13 of FIG. 11.

FIG. 17 is an enlarged view of the inner surface of the hollow core of the larger upstanding support member taken along lines 17—17 of FIG. 16.

FIG. 21 is a perspective view of applicant's new and novel holder, the holder embodiment as shown being used on an automobile window to support a camera.

FIG. 22 is an enlarged perspective view of applicant's new and novel holder as shown in FIG. 21, the holder shown in position on an automobile window and being shown supporting a representative object such as a camera lens or the like.

FIG. 23 is an elevational view taken along lines 23—23 of FIG. 22.

FIG. 24 is a side elevational view of applicant's new and novel holder, the holder shown in position on an automobile window.

FIG. 25 is a cross-sectional view taken along lines 25—25 of FIG. 24.

FIG. 26 is a bottom plan view taken along lines 26—26 of FIG. 23.

FIG. 27 is a block diagram showing the applicants' novel method.

DESCRIPTION OF THE PREFERRED EMBODIMENT

Figure 1:
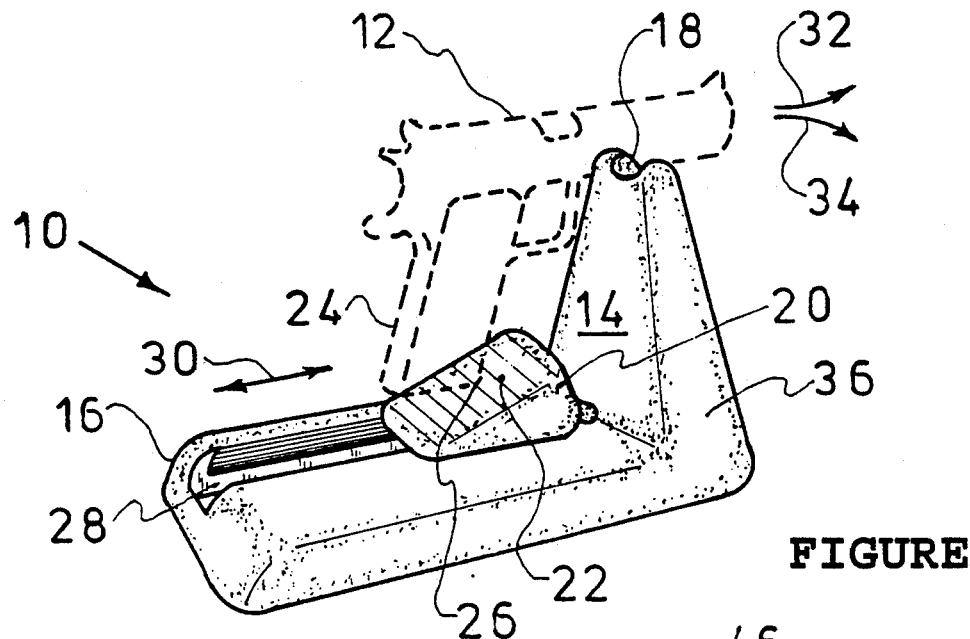
FIG. 1 is a perspective view of applicant's new and novel holder, the holder embodiment as shown being particularly suited for handguns.

Referring to the drawings in general and in particular to FIG. 1 of the drawings, there is shown applicant's new and novel holder or support device unit shown generally by the numeral 10. The holder 10 in FIG. 1 is shown being used with a pistol shown in dashed lines generally by the numeral 12.

An upstanding support member or upper portion 14 and a base section or elongated member 16 are continuously and seamlessly formed from a semi-rigid material. The semi-rigid material will be discussed more fully hereinafter. A pillow or cradle area 18 is further formed in the apex of the upstanding support member or upper portion 14. The pillow or cradle area 18 is designed to accept items of various rounded dimensions.

An inclined support member 20 which functions as an adjustment block, is movably attached to the base section 16. The inclined support member 20 which functions as an adjustment block, has formed thereon an inclined surface 22 which accepts a pistol butt 24 at a contact point 26.

The inclined member 20 in the Preferred Embodiment illustrated with an inclined surface 22 has been designed to accept a handgun such as a pistol, revolver or other type handgun, to provide the new and novel desired result. Other configurations are considered to be within the spirit and scope of the applicant's invention.

An elongated slot or groove 28, which carries the inclined support member 20, is formed in the base section or elongated member 16. The elongated slot 28 allows the inclined support member 20 to be moved in the direction indicated by the arrow 30 along an axis of the base section 16. Details of the elongated slot will be discussed more fully hereinafter.

When a pistol 12 or other object is placed on applicant's new and novel holder or support device unit, the angle of the pistol barrel can be varied by moving the pistol butt 24 along the inclined surface 22 of the inclined support member 20. The angle of the pistol barrel can be in an upward direction as shown generally by the arrow 32 in FIG. 1 of the drawings or the angle can be in a downward direction as shown generally by the arrow 34 in FIG. 1 of the drawings. The butt 24 of the handgun such as a pistol, can also be moved sideways on the inclined surface 22 for purposes of accurately sighting the pistol.

The pillow or cradle area 18 allows the barrel of the pistol to pivot along an axis of the pillow area 18 when the pistol butt 24 is adjusted upwardly and downwardly as well as sideways as described above. The pillow or cradle area 18 may also support other items that may be used with applicant's new and novel holder or support device unit 10.

This unique design allows applicant's new and novel holder to accept firearms or other items of varying lengths. Adjustment, of the inclined support member 22 along the length of the elongated slot or groove 28 in the direction of the arrow 30 allows firearms with short or long barrels to be supported by the holder 10 as well as other items.

Applicant's new and novel holder 10 is formed from a multi-element alloy balanced component which is formed into a semi-rigid form. The component in the Preferred Embodiment has been designed to be a polyurethane foam and more particularly a two element alloy balanced polyurethane material which produces a microcellular core with a tough leather-like exterior surface or skin 36 which is integral with the core to provide the new and novel desired result. Other components and exterior surface or skin textures are considered to be within the spirit and scope of the applicant's invention.

The tough exterior surface 36 has a leather-like texture. The leather-like texture provides a positive gripping surface that prevents the pistol butt 24 from slipping down the incline surface 22 of the incline support member 20 when a handgun such as a pistol 12 or other item is being displayed or used with applicant's holder 10. The tough exterior surface or skin 36 along with the flexible foam core also serves to absorb firing inertia when the holder is used at a pistol range.

Figure 2:
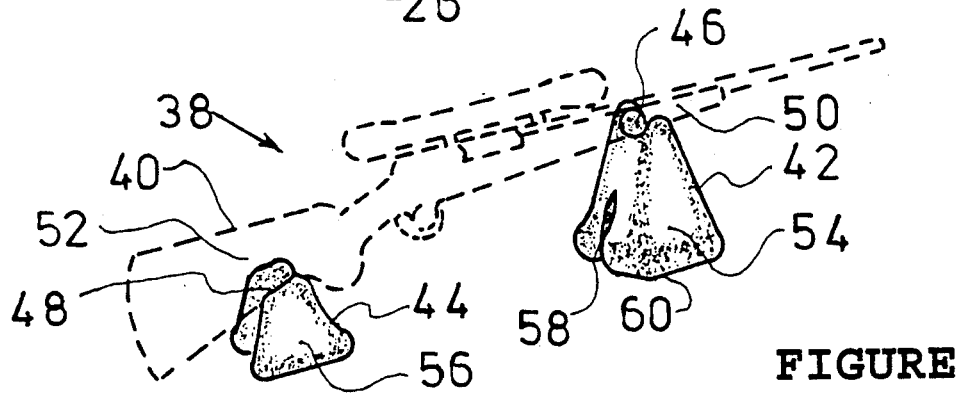
FIG. 2 is a perspective view of applicant's new and novel holder, the holder embodiment as shown being particularly suited for rifles or shotguns.

Referring now to FIG. 2 of the drawings, there is shown another embodiment of the applicant's new and novel holder or support device unit shown generally by the numeral 38. The holder embodiment in FIG. 2 is shown being used with a rifle shown in dashed lines generally by the numeral 40.

A larger upstanding support member 42 supports the front stock 50 of a long gun such as a rifle 40 while a smaller upstanding support member 44 supports the rear stock 52 of the long gun or rifle 40. The upstanding support members 42 and 44 are formed from the same semi-rigid material used to form the pistol holder shown in FIG. 1 of the drawings.

Still referring to FIG. 2 of the drawings, there is formed in the apex of the larger upstanding support member 44 and the smaller upstanding support member 44 a pillow or cradle area 46 and 48 respectively. The particular design of the cradle area 46 will be discussed more fully hereinafter. The pillow or cradle area 48 of the smaller upstanding support member 44 is designed to accept the rear stock 52 of the rifle 40. The applicant's invention may be used with the various types of long guns such as rifles, shotguns nd other types of long guns.

The exterior surface or skin 54 of the larger upstanding support member 42 and the exterior skin 56 of the smaller upstanding support member 44 has a tough leather-like texture. The leather-like texture provides a positive gripping surface that prevents the rifle 40 from slipping when a rifle 40 or other item is being displayed or used with applicant's holder 38.

Adjustment of the angle of the barrel of the rifle is accomplished quickly and easily by moving either of the support device unit members, 42 or 44, closer or further apart as needed. Additionally, the separate support unit members 42 and 44 do not interfere with a sportsman's sighting position preserving the comfort level and allowing the sportsman great latitude in the firing position he/she may assume.

Figure 3:
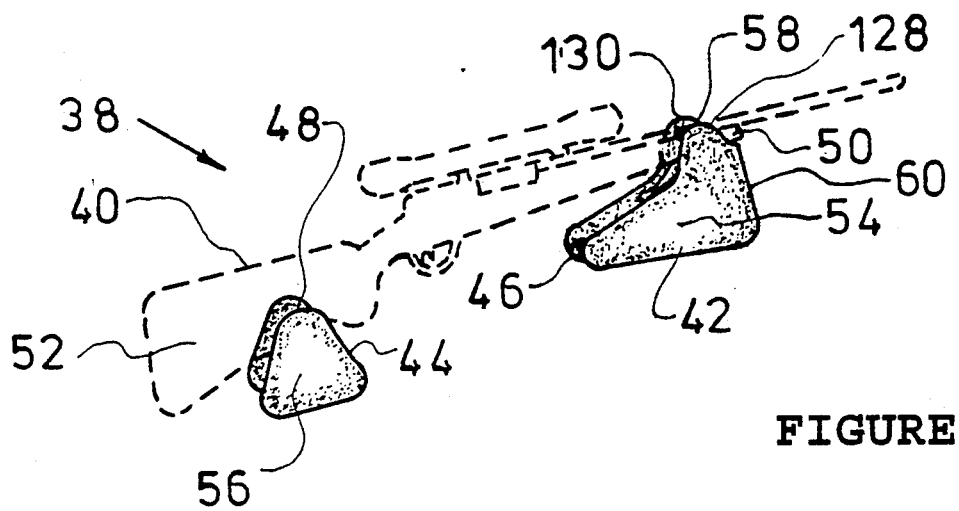
FIG. 3 is a perspective view of applicant's new and novel holder shown in FIG. 2 showing the larger upstanding support member positioned on its back to expose and utilize a second pillow or cradle area used in this embodiment.

Referring now to FIG. 3 of the drawings, there is shown applicant's new and novel holder or support device unit shown in FIG. 2 used in a different manner. The larger upstanding support member 42 can be positioned on its back as shown to utilize a second pillow or cradle area 58 as shown in FIG. 3 of the drawings.

The larger upstanding support member 42 can be positioned with the base 60 directed away from the user or directed toward the user, the former position being shown in FIG. 3 of the drawings. The larger upstanding support member has been designed with a second pillow area 58 to further aid in the height adjustment of the rifle 40 for sighting or displaying purposes.

The base 60 of the larger upstanding support member has formed therein a hollow core 62 (not shown in FIG. 3). The function of the hollow core 62 will be discussed more fully hereinafter when referring to FIG. 12 of the drawings.

Referring now to FIG. 4 of the drawings, there is shown applicant's new and novel holder or support device unit shown generally by the numeral 10. The particular holder shown in FIG. 4 has been designed to support a pistol which is not shown for purposes of clarity.

The holder 10, as before described, is formed with an upstanding support member 14 continuously and seamlessly formed from a base section 16. A pillow or cradle area 18 is formed in the apex of the upstanding support member 14. The pillow area 18 serves to support the barrel of a pistol allowing the barrel to pivot along an axis of the pillow area 18.

The base section 16 has formed therein an elongated slot 28 which carries the inclined support member 20 in the direction of the arrow 30 as shown in FIG. 4 of the drawings. The base section 16 also has formed thereon elongated lips 66 and 68, the function of which will be discussed more fully hereinafter.

The inclined support member 20 which functions as an adjustment block is fabricated from the same semi-rigid material as the holder 10 and has formed thereon an inclined surface 22 which supports the pistol butt. The semi-rigid material in the Preferred Embodiment has been designed to be a polyurethane foam and more particularly a two element alloy balanced polyurethane material which produces a microcellular core with a tough leather-like exterior skin 36 to provide the new and novel desired result. Other components and exterior skin textures are considered to be within the spirit and scope of the applicant's invention.

The leather-like exterior skin provides a positive gripping surface to prevent a pistol butt 24 from slipping down the inclined surface 22 when the holder 10 is used in the field or for displaying a firearm. The pistol butt 24 can be positioned and then moved on the inclined surface 22 in the direction of the arrow 64 as shown in FIG. 4 of the drawings. Adjustment of the pistol butt in the direction 64 raises or lowers the pistol butt causing a corresponding pivot of the pistol barrel over an axis of the pillow or cradle area 18. Once the adjustment is made, the leather-like texture of the exterior skin 36 prevents the pistol from slipping down the inclined surface 22. The pistol butt 24 can also be moved sideways as shown by the arrow 65 on the inclined surface 22.

Referring generally now to FIGS. 5-10 of the drawings, there is shown in more detail the structure and function of the inclined support member 20 of the applicant's new and novel holder 10.

Referring first to FIG. 5 of the drawings there is shown an elevational view of applicant's new and novel holder 10 taken along lines 5—5 of FIG. 4. The inclined support member 20 is shown in position within the elongated slot 28. The elongated lips 66 and 68 grip the inclined support member 20 as shown in FIG. 5.

FIG. 6 is reduced elevational view of applicant's new and novel holder 10 with the inclined support member 20 removed for purposes of clarity. It can been seen from FIG. 6 that the elongated lips 66 and 68 are continuously and seamlessly formed from the base section 16 of the holder 10 in the elongated slot 28. The elongated slot 28 along with the elongated lips 66 and 68 may be used to hold a hand gun 12 in a non-firing position as shown in dashed lines in FIG. 6. This may occur when a shooter finishes firing and positions his handgun in the pistol holder device as shown instead of laying it down on a flat surface on it's side at the range.

FIG. 7 is top plan view taken along lines 7—7 of FIG. 6. It can be seen from FIG. 7 that the elongated lips 66 and 68 extend into the space formed by the elongated slot or groove 28 thereby providing a gripping means by which the inclined support member 20 (not shown in FIG. 7 for purposes of clarity) is held close to the base section 16 of the applicant's new and novel holder 10.

Referring now to FIGS. 8 and 9, there is shown in more detail the structure of the inclined support member 20. FIG. 8 is a rear end view of the inclined support member 20. FIG. 9 is a bottom plan view of the inclined support member 20.

The inclined support member 20 has continuously and seamlessly formed thereon a protuberance 70. The protuberance 70 has formed therein two concave recess areas 72 and 74. The concave recess areas 72 and 74 are designed to encompass the elongated lips 66 and 68 on the base section 16 respectively. The inclined support member 20 can then be moved along the length of the elongated slot 28, as shown by the arrow 30 in FIGS. 4 and 7, while being firmly held in place in the elongated slot 28 in the base section 16 of the holder 10 when the desired position is obtained.

The two concave recess areas 72 and 74 shown in the embodiment of FIGS. 4-10 were designed for use with handguns to provide the new and novel desired results. Other configurations are considered to be within the spirit and scope of the applicant's invention.

Referring now to FIG. 10 of the drawings, there is shown a right side view of the inclined support member generally shown by the numeral 20. The angle 76 of the inclined surface 22 has been shown in the Preferred Embodiment for use with handguns to provide the new and novel desired results and may range from approximately 20 degrees to 40 degrees. In the preferred embodiment, the angle of approximately 30 degrees has been found to be satisfactory. Other angles are considered to be within the spirit and scope of the applicant's invention.

Referring generally now to FIGS. 11-20 of the drawings, there is shown in more detail the structure of applicant's new and novel holders or support device units shown generally by the numerals 42 and 44. The holders shown in FIGS. 11-20 are of the type which may be used with a long gun such as rifle, shotgun or the like which has not been shown for purposes of clarity. Portions of the rifle are shown in dashed lines in FIG. 13 and this will be discussed hereinafter when referring to that Figure.

Referring now to FIG. 11, there is shown a larger upstanding support member shown generally by the numeral 42 and a smaller upstanding support member shown generally by the numeral 44. The upstanding support members 42 and 44 are constructed from the semi-rigid material hereinbefore described.

The exterior leather-like skin 56 of the smaller upstanding support member provides a positive gripping surface so that the smaller upstanding support member 44 can be positioned inside of the base 60 of the larger upstanding support member 42, as shown by the arrow 78 in FIG. 12 of the drawings. The storage of the smaller upstanding support member 44 in the base 60 of the larger upstanding support member 42 will be discussed in more detail hereinafter.

Figure 14:
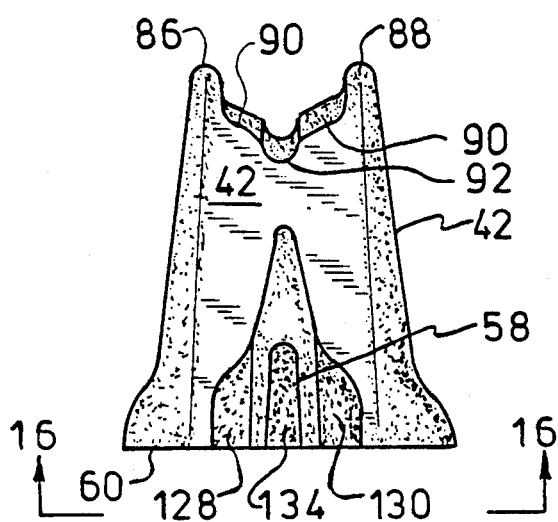
FIG. 14 is an elevational front end view of the larger upstanding support member taken along lines 14—14 of FIG. 11.

Referring now to FIGS. 13 and 14 of the drawings, there is shown a larger upstanding support member shown generally by the numeral 42 and more particularly the details of the pillow or cradle area shown generally by the numeral 46.

Referring first to FIG. 13 of the drawings taken along the lines 13—13 of FIG. 11, there is shown a pillow or cradle area shown generally by the numeral 46. The pillow or cradle area 46 is designed to accept a variety of forearms or front stocks of firearms as shown by the dashed line 80 for a wide type of forearm and by the dashed line 82 for a narrow type. The relative diameter of the barrel of the firearm is shown by the barrel channel 81 for the wide forearm 80 and by the barrel channel 83 for the narrow forearm 82.

The cradle area 46 has formed thereon opposing outer support areas 86 and 88 which are formed with a pair of larger inner curves 90 forming a U-shape connected by a smaller U-shaped inner curve 92. The forearm stock of a firearm has a rounded bottom portion causing the firearm to roll when the forearm stock is placed on a flat surface. A wide forearm 80 contacts the larger U-shaped inner curves 90 at the contact points 94 and 96 and a narrow forearm 82 contacts the smaller U-shaped inner curve 92 at the two contact points 98 and 100 thus preventing any rolling motion of the firearm. Prior art devices permit only one contact as a result of the particular design of the prior art device.

The smaller U-shaped inner curve 92 also allows any sling studs 84, which may be attached to the bottom of a forearm 80 or 82, to pass through the smaller U-shaped inner curve 92. Additionally, the barrel of a firearm may be positioned in the smaller inner curve 92 with the end of the forearm abutting the front or back surface of the larger upstanding support member 42.

Referring now to FIG. 14 of the drawings taken along the lines 14—14 of FIG. 11, there is shown a larger upstanding support member shown generally by the numeral 42 and more particularly the second pillow or cradle area shown by the numeral 58. The details of the second pillow area 58 will be discussed hereinafter.

Figure 15:
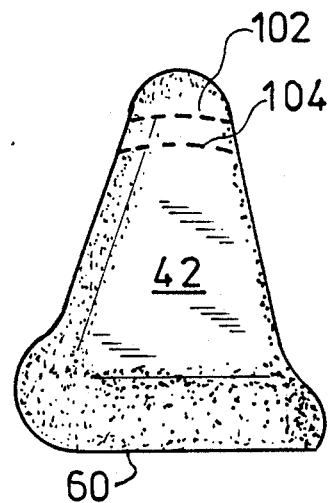
FIG. 15 is a right side elevational view of the larger upstanding support member taken along lines 15—15 of FIG. 11.

Referring now to FIG. 15 of the drawings taken along lines 15—15 of FIG. 11, there is shown a right side view of a larger upstanding support member shown generally by the numeral 42. The larger U-shaped inner curves 90 has a slight radius which is inclined somewhat as indicated by the dashed line 102 and the smaller U-shaped inner curve 92 is formed with a similar radius which is inclined somewhat as shown by the dashed line 104. The incline of the inner curves 90 and 92 facilitates the adjustment of the firearm for sighting purposes. The angle of the incline can range approximately between five degrees and fifteen degrees and the preferred angle has been found to be approximately ten degrees from the horizontal.

Placing the larger upstanding support member 42 with the inclines 102 and 104 running downwardly from the firearm, the barrel the firearm can be positioned to sight to an object lower than the firearm. Placing the larger upstanding support member 42 with the inclines 102 and 104 running upwardly from the firearm, the barrel of the firearm can be positioned to sight to an object higher than the firearm.

Referring generally to FIGS. 16-20 of the drawings, there will be described in detail the before referred to stacking feature the larger upstanding support member 42 and the smaller upstanding support member 44.

Figure 16:
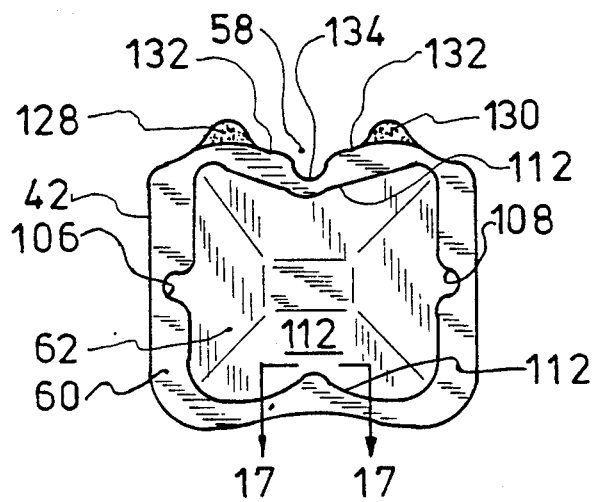
FIG. 16 is a bottom plan view of the larger upstanding support member taken along lines 16—16 of FIG. 14.

Referring now to FIG. 16 of the drawings taken along lines 16—16 of FIG. 14, there is shown a bottom plan view of the larger upstanding support member 42. The larger upstanding support member 42 has formed in the base 60 a hollow core 62. Along opposing sides of the hollow core 60 and extending upwardly into the inner surface 112 of the larger upstanding support member 42 are finger notches 106 and 108.

The finger notches 106 and 108 allow the user to insert a thumb and a finger into the finger notches 106 and 108 to facilitate removal of the smaller upstanding support member 44 after it has been inserted in the hollow core 62 of the larger upstanding support member 42. The insertion of the smaller upstanding support member 44 into the larger upstanding support member 42 permits the holder to be easily stored and transported.

Referring now to FIG. 17 of the drawings taken along lines 17—17 of FIG. 16, there is shown an enlarged view of a section of the inner surface 112 of the hollow core 62. A semi-circular indent 110 is formed in the inner surface 112 of the hollow core 62 near the base 60 of the larger upstanding support member 42.

Another semi-circular indent 110 may be formed on the opposite side of the inner surface 112 in the same position. Two semi-circular indents 110 are shown in the Preferred Embodiment for purposes of illustration only. Other configurations are considered to be within the spirit and scope of applicant's invention.

Figure 20:
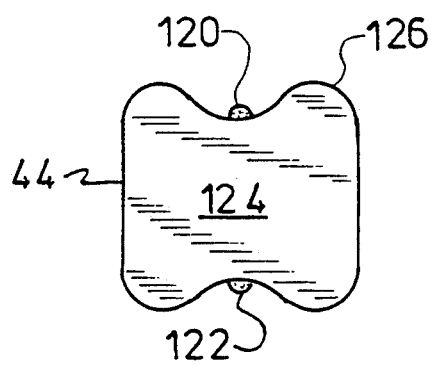
FIG. 20 is bottom plan view of the smaller upstanding support member taken along lines 20—20 of FIG. 18.
Figure 19:
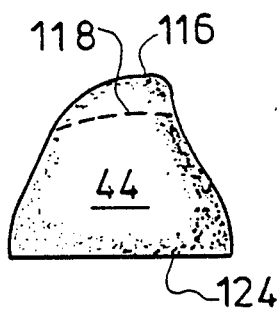
FIG. 19 is a right side elevational view of the smaller upstanding support member taken along lines 19—19 of FIG. 18.
Figure 18:
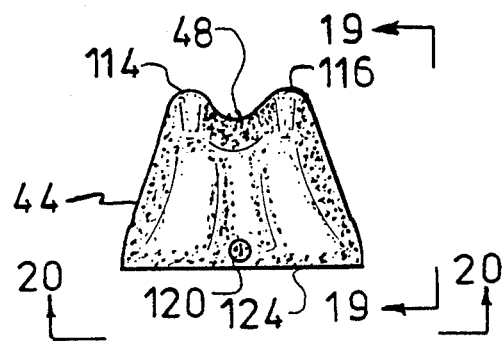
FIG. 18 is an elevational front end view of the smaller upstanding support member taken along lines 18—18 of FIG. 11.

Referring generally now to FIGS. 18-20 and particularly to FIG. 18, there is shown the smaller upstanding support member shown generally by the numeral 44. FIG. 18 is an end view taken along lines 18—18 of FIG. 11, FIG. 19 is left side view taken along lines 19—19 of FIG. 18 and FIG. 20 is a bottom plan view taken along lines 20—20 of FIG. 18.

Opposing outer support areas 114 and 116 are formed at the apex of the smaller upstanding support member 44. The pillow or cradle area 48 is formed between the opposing outer support areas 114 and 116. The pillow or cradle area 48 is formed with a slight radius and is inclined somewhat as shown by the dashed line 118, the incline approximating the angle of the rear stock of a typical rifle which has not been shown for purposes of clarity. The incline would range approximately from twenty to thirty degrees and in the Preferred Embodiment shown would be formed at a twenty five degree angle to the horizontal.

The incline 118 is provided to assist the shooter in properly adjusting the height of the firearm for sighting purposes. The incline 118 of the smaller upstanding support member 44 can be used in conjunction with the inclines 102 and 104 of the larger upstanding support member for sighting purposes.

Referring now to FIGS. 18 and 20 there is shown holding buttons 120 and 122. The holding buttons 120 and 122 approximate the size of the semi-circular indents 110 which are located in the inner surface 112 of the larger upstanding support member as shown in FIG. 17 of the drawings. The holding buttons 120 and 122 fit into the semi-circular indents 110 thereby providing a positive locking or holding means when the smaller upstanding support member 44 is inserted into the hollow core 62 of the larger upstanding support member 42 as shown in FIG. 12 of the drawings.

Still referring to FIGS. 18 and 20 of the drawings, the base 124 of the smaller upstanding support member 44 has integrally formed base curves 126 which mate with the curve of the hollow core 62 shown in FIG. 16. The mating of the base curve 126 with the hollow core 62 further prevents improper insertion of the smaller upstanding support member 44 into the larger upstanding support member 42.

Referring briefly back to FIGS. 14 and 16 of the drawings there will be a brief discussion of the second pillow or cradle area 58 of the larger upstanding support member 42. The larger upstanding support member can be positioned on its back so that the second pillow area 58 is in an upward position as shown generally in FIGS. 3 and 16 of the drawings.

The second pillow or cradle area 58 of the larger upstanding support member 42 has formed thereon opposing outer support areas 128 and 130 which are formed with a larger U-shaped inner curve 132 and a smaller U-shaped inner curve 134. As described before, the forearm stock of a firearm has a rounded bottom portion causing the firearm to roll when the forearm stock is placed on a flat surface. The opposing outer support areas 128 and 130 and the U-shaped inner curved surfaces 132 and 134 prevent a firearm with any size forearm stock from rolling.

The smaller U-shaped inner curve 134 also allows any sling studs 84, which are not shown in FIGS. 14 and 16 for purposes of clarity, to pass through the smaller U-shaped inner curve 134. Additionally, the barrel of a firearm may be positioned in the smaller U-shaped inner curve 134 with the end of the forearm abutting the apex or base 60 of the larger upstanding support member 42.

Referring generally now to FIGS. 21-26 and more particularly FIG. 21 of the drawings, there will be a detailed discussion of how applicant's new and novel holder may be designed in another embodiment which may be utilized as a support device for items other than firearms.

Referring to FIG. 21 of the drawings, there is shown a perspective view of the applicant's new and novel modified holder shown generally by the numeral 136 positioned on a lowered vehicle window 144. A person 140 may effectively support an item such as camera 138, telescope or the like without damage to the item or the vehicle 142.

Referring now to FIGS. 22-25 of the drawings, there is shown in more detail applicant's new and novel modified holder shown generally by the numeral 136 in position on a vehicle window 144 or other type of vertically positioned planar object. The pillow or cradle area 146 is continuously and seamlessly formed from the base area 148 of the same semi-rigid component used in the before described variations of applicant's new and novel holders or support device units 10 and 38.

The upper area 150 has continuously and seamlessly formed thereon upturned ends 152 and 154 which may be used to help stabilize and prevent sideways rolling of an item such as a camera, telescope or the like shown generally in dashed lines by the numeral 156. The holder or support device unit 136 is stabilized by positioning the elongated slot 158 over and around a vertically positioned planar object such as a window 144.

Referring now to FIGS. 24 and 25 of the drawings, there will be a discussion of how the applicant's new and novel holder 136 allows items of varying dimensions to be easily and effectively adjusted for sighting purposes.

The pillow or cradle area 146 of the upper area 150 is formed in an elongated convex shape 160. The elongated convex shape allows items 156 of varying widths to be positioned, in the direction of the arrow shown generally by the numeral 162 in FIG. 24 of the drawings, on the pillow or cradle area 146. The inner ends 164 and 166 act as further stabilizing supports for the item 156. The elongated convex shape 160 further allows the user to pivot the item 156 on the pillow or cradle area 146 in the direction shown generally by the numeral 168 in FIG. 25 of the drawings.

It can be seen that the applicant's new and novel holder or support device unit easily absorbs the inertia created from the discharge of a firearm. This unique feature is accomplished by using multi-alloy balanced elements to form one component from which the holder is formed. The tough leather-like exterior skin is an integral part of the single component. The positive gripping surface of the tough leather-like exterior skin acts synergistically with the single component so that the inertia created by the firearm is absorbed directly into the material component and not into the exterior skin alone.

Referring now to FIG. 27 of the drawings, there will be described the new and novel method which is used to produce the one piece non-peeling and non-stitched holder. The first step in the method, as shown by the numeral 170, is to provide the mold for the holder with a leather-like skin surface which will simulate the appearance of real leather.

The mold is then filled, in the next step as shown by the numeral 172, with a flexible low viscosity liquid polyurethane foam which can produce a microcellular core and a tough outer surface or skin which is integrally formed with the core.

The flexible polyurethane foam may be a multi-alloy balanced component foam of the type developed for reaction injection moldimg (RIM) applications. One type that has been found to be satisfactory is the product known as BUC 970 as manufactured by Burtin Corporation of Santa Anna, Calif. This material is detailed in the specification sheet filed with this application as prior art herewith. Other materials may also be used which will have the necessary qualities as outlined and are considered to be within the spirit and scope of the applicant's invention.

After the mold is filled, in the next step shown as the numeral 174, the liquid foam is allowed to cure to form the semi-rigid one piece holder having the tough exterior integrally formed skin surface with a leather-like appearance.

Finally, in the last step shown as the numeral 176, the holder removed from the mold and has the necessary shape and skin texture as well as core construction to be able to hold devices such as firearms and other devices. The novel use of the particular microcellular construction with a skin surface that appears like leather allows the holder to function to absorb firing inertia and shocks as well as vibrations when used in various applications. These shocks and vibrations are absorbed by frictional contact with the leather-like skin surface and by the microcellular inner construction which absorbs most of the firing inertia.

From the above it can be seen that the applicant's new and novel holder or support device unit accomplishes all of the object's and advantages presented herein before. Nevertheless it is within the spirit and scope of the invention that changes in the applicant's basic device may be made and the Preferred Embodiment and in the several modifications shown and described herein which have only been given by way of illustration.

Having described our invention, we claim:

1. A support, having an outside, for supporting an item and for positioning the support on top of a separate flat surface so that the support may be positioned and moved on the separate flat surface but is not fastened thereto, comprising:
   (a) at least one rectangular shaped flat lower base portion which may be positioned on top of the separate flat surface but is not fastened to the separate flat surface,
   (b) at least one upper portion formed of a single material with the base portion,
   (c) at least one exterior surface formed on the outside of the support, the exterior surface being formed from a polyurethane material and being formed of the same single material as the upper portion and the base portion,
   (d) means, formed in the upper portion of the support, defining a cradle area for supporting the item being supported so that the item may be supported and moved in multi-directions within the cradle area but not clamped within the cradle area, the cradle area of the support permitting the item that is supported by the support to be used and moved as desired, but not to be restrained and clamped, while being supported by the device and while the item is positioned on the support device, and
   (e) the support being formed from a semi-rigid, pre-shaped polyurethane material with a microcellular core.

2. The support as described in claim 1 wherein the cradle area is designed with a pre-determined shape that will support a stock portion of a firearm and will permit the firearm to be moved in multi-directions within the cradle area but not to be clamped within the cradle area while the firearm is being used.

3. The support as defined in claim 1 further comprising the support being formed in a two piece configuration with similarly shaped separate larger and smaller supports and with the larger support having formed therein a cavity, the cavity being formed in the lower base portion of the similar shaped separate larger support, the cavity formed in the similar separate larger support also being designed to fit over and to totally enclose the separate smaller support, the cavity of the separate larger support acting as a storage receptacle for the separate smaller support whenever the smaller support has been positioned in and is being stored within the cavity of the larger support.

4. A support for supporting an item on a separate flat surface and for positioning the supported item on top of the separate flat surface so that the support, with the item positioned thereon, may be positioned and moved on the support and the support may be moved on the separate flat surface but is not fastened to the separate flat surface, comprising:
   a. at least one rectangular shaped flat base section formed on, but not physically fastened to, a separate flat surface;
   b. at least one upstanding support member, formed of a single material with the base section;
   c. means, formed on top of the upstanding support member of the support, defining a rigid, pre-shaped pillow area, for supporting but not restraining and clamping the item to be supported so that the item to be supported may be moved in multi-directions on the support, as desired, within the pre-shaped pillow area while not limiting the motion of the item being supported to a single direction; and
   d. the support being formed from a polyurethane material with a microcellular core.

5. The support as defined in claim 4 wherein the pillow area is formed in an approximate U-shaped configuration which permits the item to be moved and to be supported but not to be clamped and restrained within the U-shaped pillow area.

6. The support as defined in claim 4 wherein the polyurethane material is a two component material which, when molded, forms a semi-rigid, microcellular core.

7. The support as defined in claim 4 wherein the support is formed with two separate upstanding support members which are spaced apart when the support is used on the separate flat surface to support an item, with each support member having a U-shaped pillow area and the U-shaped pillow areas of the support are designed to support but not to clamp various types of rifles.

8. The support as defined in claim 7 wherein one of the support members has an additional pillow area formed on a side of the support member and in proximity to the base section, the additional pillow area being designed to support the item but not to clamp the item whenever the one support member is positioned on one of its sides, thereby permitting the item to be moved within the additional pillow area as desired.

* * * * *